United States Patent
Vantsevich et al.

(10) Patent No.: US 12,330,654 B2
(45) Date of Patent: Jun. 17, 2025

(54) OPTIMIZING VEHICLE MOBILITY PERFORMANCE

(71) Applicants: Worcester Polytechnic Institute, Worcester, MA (US); THE UAB RESEARCH FOUNDATION, Birmingham, AL (US)

(72) Inventors: Vladimir V. Vantsevich, Worcester, MA (US); David J. Gorsich, Detroit Arsenal, MI (US); Lee Moradi, Worcester, MA (US); Jesse R. Paldan, Worcester, MA (US); Masood Ghasemi, Worcester, MA (US)

(73) Assignees: Worcester Polytechnic Institute, Worcester, MA (US); The UAB Research Foundation, Birmingham, AL (US); Government of the United States, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/101,916

(22) Filed: Jan. 26, 2023

(65) Prior Publication Data
US 2023/0242120 A1    Aug. 3, 2023

Related U.S. Application Data

(60) Provisional application No. 63/304,329, filed on Jan. 28, 2022.

(51) Int. Cl.
*B60W 30/18* (2012.01)
*B60W 30/188* (2012.01)
*B60W 40/10* (2012.01)

(52) U.S. Cl.
CPC .... *B60W 30/18172* (2013.01); *B60W 30/188* (2013.01); *B60W 40/10* (2013.01);
(Continued)

(58) Field of Classification Search
CPC .......... B60W 10/18; B60W 30/18172; B60W 30/188; B60W 40/10;
(Continued)

(56) References Cited

U.S. PATENT DOCUMENTS 5,168,950 A     12/1992  Krusche
9,527,510 B2 *  12/2016  Katsuyama ........... B60W 30/18
(Continued)

FOREIGN PATENT DOCUMENTS

CN      109664774 A       4/2019
KR    1020180049576 A     5/2018

OTHER PUBLICATIONS

Choi, KR 20180049576, machine translation. (Year: 2018).*
International Search Report, PCT/US2023/011633, May 15, 2023, pp. 1-3.

*Primary Examiner* — Mark L. Greene
(74) *Attorney, Agent, or Firm* — Armis IP Law, LLC

(57) ABSTRACT

A method of optimizing vehicle mobility performance includes receiving technical parameters for each wheel associated with wheel power of the particular wheel on a particular terrain. The method includes determining an optimal vehicle mobility performance by determining an optimal tire slippage for one wheel based on the set of technical parameters for the wheel and individually determining an optimal tire slippage for another wheel based on the set of technical parameters for the other wheel. A system may utilize such a method to control mobility performance in a vehicle such as, but not limited to, an autonomous ground vehicle.

18 Claims, 4 Drawing Sheets

(52) U.S. Cl.
CPC ..... *B60W 2520/26* (2013.01); *B60W 2520/28* (2013.01); *B60W 2552/15* (2020.02); *B60W 2710/083* (2013.01); *B60W 2720/26* (2013.01)

(58) Field of Classification Search
CPC . B60W 2520/26–406; B60W 2552/15; B60W 2710/083; B60W 2720/26
See application file for complete search history.

(56) References Cited

U.S. PATENT DOCUMENTS

2007/0213912 A1 9/2007 Deur et al.
2020/0247394 A1 8/2020 Arima et al.

* cited by examiner

OPTIMIZING VEHICLE MOBILITY PERFORMANCE

RELATED APPLICATIONS

This patent application claims the benefit under 35 U.S.C. § 119(e) of U.S. Provisional Patent App. No. 63/304,329 filed Jan. 28, 2022, entitled "OPTIMIZING VEHICLE MOBILITY PERFORMANCE" incorporated herein by reference in entirety.

GOVERNMENT LICENSE RIGHTS

This invention was made with government support under Contract No. W56HZV-19-2-0001 awarded by U.S. Army Ground Vehicle Systems Center. The government has certain rights in the Invention.

FIELD OF THE INVENTION

The present disclosure relates to generally ground-based vehicles on Earth and other celestial bodies, and, more particularly, to systems and methods for optimizing mobility performance of such vehicles.

BACKGROUND

Conventional mobility performance of a vehicle is analyzed after a vehicle is simulated on an off-road course and after vehicle-wheels-terrain interaction characteristics are computed. However, such conventional techniques typically analyze mobility in terms of energy efficiency, and none of them identify mobility in terms of performance or the vehicle's ability to perform a primary mission or task. While energy efficiency may be acceptable in some circumstances, energy efficiency in other applications may not be acceptable and/or preferable and may compromise technical productivity/efficiency of the vehicle, particularly for autonomous ground vehicles that must be capable and able to operate autonomously in hyper-dynamic changing terrain conditions and environments, which are much more severe than paved or dirt roads and may be terrains where manned vehicles cannot operate.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Embodiments provided herein are directed to providing systems and methods for optimizing vehicle mobility performance of vehicles such as but not limited to autonomous ground vehicles. In certain embodiments, the systems and methods described herein may optimize vehicle mobility performance based on technical parameters characterizing the vehicle's technical productivity/efficiency rather than the vehicle's energy efficiency. In some embodiments, energy efficiency may be considered as a supplementary consideration for optimizing vehicle mobility performance.

According to certain embodiments, a method includes receiving a set of technical parameters associated with wheel power of at least one wheel of a vehicle on a terrain, where the set of technical parameters includes a first technical parameter and a second technical parameter, and where the first technical parameter is a wheel circumferential force and the second technical parameter is a velocity. The method includes estimating an actual mobility performance based on the received set of technical parameters, determining a maximum mobility performance for the vehicle comprising the at least one wheel on the terrain, and comparing the actual mobility performance to the maximum mobility performance. The method may include controlling the vehicle based on a difference between the actual mobility performance and the maximum mobility performance.

According to some embodiments, a method includes receiving a plurality of sets of technical parameters associated with wheel power of at least one wheel for a vehicle on a terrain. Each set of technical parameters includes a first technical parameter and a second technical parameter, and the first technical parameter of each set is a wheel circumferential force and the second technical parameter of each set is a velocity. The method includes estimating an actual mobility performance for each set of technical parameters and based on the first technical parameter and the second technical parameter for each set of technical parameters, determining a maximum mobility performance for the vehicle comprising the at least one wheel on the terrain, and generating a mobility performance index based on a comparison of the estimated actual mobility performances with the maximum mobility performance. In some embodiments, the method includes determining an optimal tire slippage for the at least one wheel on the terrain based on the mobility performance index, and controlling the vehicle based on the optimal tire slippage.

According to some embodiments, a vehicle system includes one or more data processors and a non-transitory computer readable storage medium containing instructions which, when executed on the one or more data processors, cause the one or more data processors to perform actions. The actions may include receiving a plurality of sets of technical parameters associated with wheel power of at least one wheel of a vehicle on a terrain, where each set of technical parameters include a first technical parameter and a second technical parameter, and where the first technical parameter of each set is a wheel circumferential force and the second technical parameter of each set includes a velocity. The actions may include estimating an actual mobility performance for each set of technical parameters and based on the first technical parameter and the second technical parameter for each set of technical parameters, generating a mobility performance index based on a comparison of the estimated actual mobility performances with a maximum mobility performance for the vehicle on the terrain, and determining an optimal tire slippage for the at least one wheel on the terrain based on the mobility performance index. The actions may include generating a control signal for controlling the vehicle based on the optimal tire slippage.

According to certain embodiments, a method includes receiving a set of technical parameters associated with wheel power for each of at least a first wheel and a second wheel of a vehicle, the set of technical parameters including a first technical parameter and a second technical parameter where the first technical parameter is a wheel circumferential force and the second technical parameter is a velocity. The method may include determining an optimal vehicle mobility performance by determining an optimal tire slippage for the first wheel based on the set of technical parameters for the first wheel and individually determining an optimal tire slippage for the second wheel based on the set of technical parameters for the second wheel. Optionally, the method includes individually controlling the first wheel and the second wheel such that the vehicle operates at the determined optimal vehicle mobility performance. In some non-limiting embodiments, the method includes receiving the set of technical parameters associated with wheel power for a plurality of wheels, such as two wheels, three wheels, four wheels, and/or any number of wheels as desired.

According to some embodiments, a method includes receiving a plurality of sets of technical parameters associated with wheel power of each of a first wheel and a second wheel of a vehicle, where each set of technical parameters includes a first technical parameter and a second technical parameter, and where the first technical parameter of each set is a wheel circumferential force and the second technical parameter of each set is a velocity. The method may include individually and for each of the first wheel and the second wheel: estimating an actual mobility performance for each set of technical parameters and based on the first technical parameter and the second technical parameter for each set of technical parameters; and generating a mobility performance index based on the estimated actual mobility performances. In some embodiments, the method includes determining an optimal vehicle mobility performance by individually determining an optimal tire slippage for the first wheel based on the mobility performance index for the first wheel and individually determining an optimal tire slippage for the second wheel based on the mobility performance index for the second wheel. The method may include individually controlling the first wheel and the second wheel such that the vehicle operates at the determined optimal vehicle mobility performance.

According to various embodiments, a vehicle system includes one or more data processors and a non-transitory computer readable storage medium containing instructions which, when executed on the one or more data processors, cause the one or more data processors to perform actions. The actions may include receiving a plurality of sets of technical parameters associated with wheel power of each of a first wheel and a second wheel of a vehicle, each set of technical parameters including a first technical parameter and a second technical parameter, where the first technical parameter of each set is a wheel circumferential force and the second technical parameter of each set is a velocity. The actions may include individually and for each of the first wheel and the second wheel: estimating an actual mobility performance for each set of technical parameters and based on the first technical parameter and the second technical parameter for each set of technical parameters; and generating a mobility performance index based on a comparison of the estimated actual mobility performances to a maximum mobility performance. In some embodiments, the actions include determining an optimal vehicle mobility performance by individually determining an optimal tire slippage for the first wheel based on the mobility performance index for the first wheel and individually determining an optimal tire slippage for the second wheel based on the mobility performance index for the second wheel. Optionally, the actions include generating a control signal for individually controlling the first wheel and the second wheel such that the vehicle operates at the determined optimal vehicle mobility performance.

According to some embodiments, method of controlling mobility performance of a wheel of a vehicle includes receiving a plurality of circumferential forces for a wheel operating on a terrain and a plurality of velocities of the wheel operating on the terrain, where each circumferential force is paired with a corresponding velocity. The method includes determining an actual mobility performance for each paired circumferential force and velocity for the wheel operating on the terrain and generating a model of the actual mobility performance. In some embodiments, the method includes determining an optimal slippage for the wheel operating on the terrain by comparing the each actual mobility performance to a maximum mobility performance for the wheel operating on the terrain and determining the optimal slippage from an actual mobility performance closest to the maximum mobility performance and with a slippage within a predetermined threshold of a characteristic slippage of the wheel on the terrain. Optionally, the method includes controlling the wheel to operate with the determined optimal slippage.

According to certain embodiments, a method of controlling mobility performance of a vehicle with at least a first wheel and a second wheel includes determining a first optimal tire slippage for the first wheel based on a circumferential force and a velocity of the first wheel operating on a first terrain. The method includes determining a second optimal tire slippage for the second wheel individual from the first wheel and based on a circumferential force and a velocity of the second wheel operating on a second terrain. In some embodiments, the method includes individually controlling the first wheel to operate at the first optimal tire slippage and the second wheel to operate at the second optimal tire slippage.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
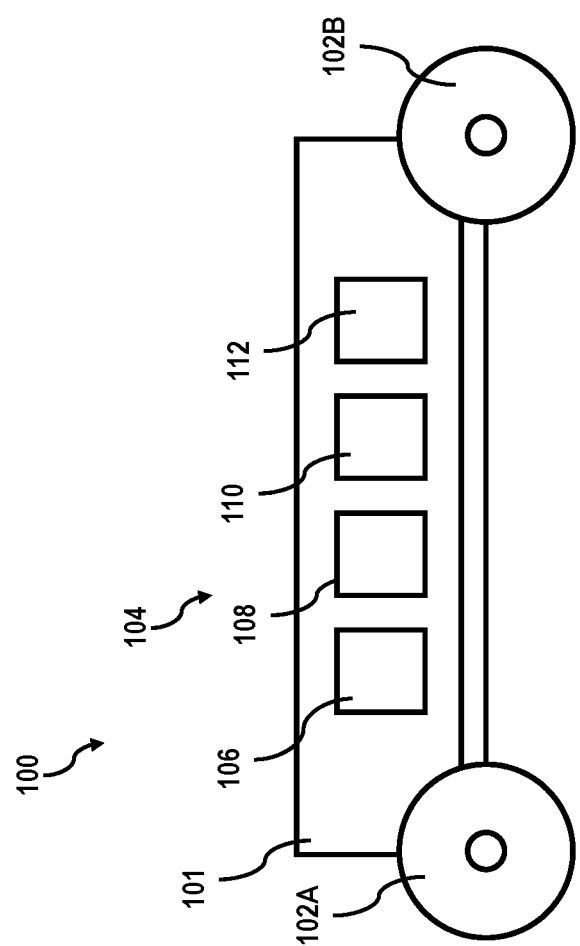
FIG. 1 illustrates a vehicle system according to embodiments.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing; however, such direction references or identifies should not be considered limiting. Throughout this disclosure, a reference numeral with a letter refers to a specific instance of an element and the reference numeral without an accompanying letter refers to the element generically or collectively. Thus, as an example (not shown in the drawings), device "12A" refers to an instance of a device class, which may be referred to collectively as devices "12" and any one of which may be referred to generically as a device "12". In the figures and the description, like numerals are intended to represent like elements. As used herein, the meaning of "a," "an," and "the" includes singular and plural references unless the context clearly dictates otherwise.

Described herein are systems and methods for optimizing mobility performance of a vehicle. In certain embodiments, the systems and methods provided herein may utilize a combination of technical parameters that characterize a vehicle's technical productivity and/or efficiency rather than energy efficiency, which enable the estimation, optimization and control of the vehicle's mobility performance. In some embodiments, mobility performance may be characterized by wheel circumferential force and velocity. A wheel mobility performance for a wheel of the vehicle may relate an actual wheel circumferential force and an actual velocity on a given terrain to a theoretical maximum performance. In certain embodiments an index of wheel mobility performance on a given terrain can be optimized to determine an optimal tire slippage for the vehicle on the terrain at which the wheel has maximized mobility performance to best perform a vehicle's missions or tasks. In some embodiments, a vehicle mobility performance for a vehicle with a given number of drive wheels may be used to determine an optimal tire slippage of each wheel individually and based on the particular operation of each wheel individually. The vehicle mobility performance may be optimized to determine the best set of tire slippages at each wheel of the vehicle, and the tire slippage at each wheel may be individually controlled such that the vehicle operates with the optimal vehicle mobility performance. It was surprising determined that the optimal tire slippage may not necessarily be the same for all wheels for the vehicle to operate at with maximum vehicle mobility performance. The systems and methods described herein provide individual control of the circumferential force and velocity at each wheel such that the vehicle may be operated at the maximum vehicle mobility performance. Various other benefits and advantages may be realized with the systems and methods described herein, and the aforementioned benefits and advantages should not be considered limiting.

FIG. 1 illustrates an example of a vehicle system 100 according to embodiments. The vehicle system 100 may be various types of vehicle systems as desired, including both manned vehicle systems and autonomous or unmanned vehicle systems. The vehicle system 100 generally includes a vehicle 101 with one or more wheels, and each wheel includes a tire 102. The tires 102 may be various suitable types of tires as desired (e.g., pneumatic, rubber, flexible material, etc.) and should not be considered limiting on the disclosure. The vehicle system 100 also includes a control system 104 for controlling operation of the one or more tires 102 during performance of an operation or task by the vehicle system 100.

In the embodiment of FIG. 1, the vehicle system includes two tires 102A-B; however, in other embodiments, any number of tires 102 may be utilized as desired. Each tire 102 includes a plurality of tire characteristics including but not limited to an inflation pressure, traction characteristic, size, etc. It will be appreciated that the tire characteristic may depend on the type of tire 102, and the examples of tire characteristics discussed herein should not be considered limiting. As a non-limiting example, a pneumatic tire may have inflation pressure as a tire characteristic while a rubber tire may not. As and where a plurality of tires 102 are provided, the tire characteristics of one of the tires need not be the same as the tire characteristics of another one of the tires. As discussed in detail below, during operation, each tire 102 includes one or more parameters that characterize technical productivity rather than energy efficiency, and such parameters may be controlled (e.g., by the control system 104) to improve and/or otherwise control mobility performance.

The control system 104 includes a controller 106, which may include one or more processing units and/or one or more memory devices. The processing unit of the controller may be various suitable processing devices or combinations of devices including but not limited to one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units, and/or a combination thereof. The one or more memory devices of the controller 106 may be any machine-readable medium that can be accessed by the processor, including but not limited to any type of long term, short term, volatile, nonvolatile, or other storage medium, and is not to be limited to any particular type of memory or number of memories, or type of media upon which memory is stored. Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

In certain embodiments, the controller 106 optionally includes an associated user interface, including but not limited to a graphical user interface, such that the controller 106 may obtain information from a user. In such embodiments, the user interface may be on the controller 106 itself or may be at a location remote from the controller 106 such as, but not limited to, another location on the vehicle 101. Additionally or alternatively, the controller 106 optionally may include various communication modules such that the vehicle system 100 may receive and/or send information as desired. Non-limiting examples of communication modules may include systems and mechanisms enabling wired communication and/or wireless communication (e.g., near field, cellular, Wi-Fi, Bluetooth®, Bluetooth Low Energy (BLE), etc.).

In certain embodiments, a driveline system 108 is provided with the vehicle system 100. The driveline system 108 may be a component of the control system 104, although it need not be in other embodiments. A powering source 112 (e.g., battery, electric generator, internal combustion engine, and/or other suitable powering source, etc.) may be operably connected to the driveline system 108, and the driveline system 108 may be various suitable devices or mechanisms for providing a driving power to one or more tires 102 during operation of the vehicle system 100. As some non-limiting examples, the driveline system 108 may be a mechanical driveline, a virtual driveline, combinations thereof, and/or various other driveline systems as desired.

Optionally, the control system 104 includes one or more sensors 110 associated with the vehicle system 100. FIG. 1 illustrates a single sensor 110. The sensors 110 may be at various locations as desired, and the number and location of sensors 110 illustrated in FIG. 1 should not be considered limiting on the disclosure. The one or more sensors 110 may be various types of sensors as desired. In some non-limiting embodiments, the one or more sensors 110 may be sensors for detecting one or more terrain parameters about a terrain on which the vehicle system 100 is moving. Additionally or alternatively, the one or more sensors 110 optionally may be sensors for detecting a parameter about the vehicle system 100. Non-limiting examples of parameters that may be detected by the one or more sensors 110 include, but are not limited to, a drawbar pull force, a wheel circumferential force, a drawbar pull power, driving power supplied to the tires, wheel torque, velocity of the vehicle system, wheel rotational velocity load on a tire, tire pressure, tire deflections, slope angle of a terrain, rolling resistance and other terrain characteristics, combinations thereof, and/or various other parameters or combinations of parameters as desired.

As discussed in detail below, the control system 104 may be operably connected to one or more components of the vehicle system 100, and the control system 104 may control the vehicle to control mobility of the vehicle 101. Optionally, and as discussed in detail below, the control system 104 may control the vehicle to optimize mobility performance of the vehicle.

Figure 2:
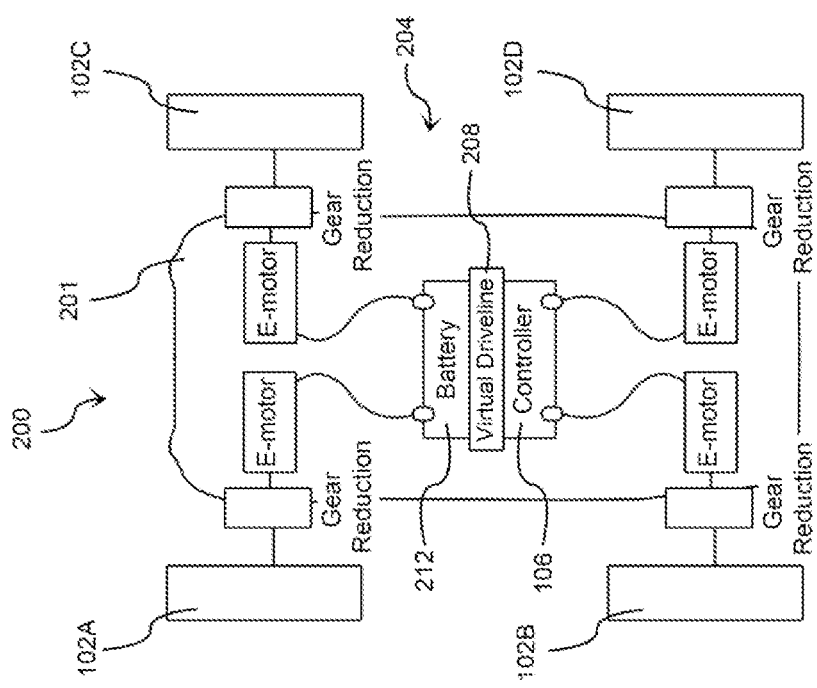
FIG. 2 illustrates another vehicle system according to embodiments.

FIG. 2 illustrates another example of a vehicle system 200 according to embodiments. The vehicle system 200 includes a fully electric vehicle 201. The vehicle system 200 is substantially similar to the vehicle system 100 and includes a plurality of tires 102A-D, a control system 204 with the controller 106 with a drive system 208. In the embodiment of FIG. 2, the drive system 208 is a virtual driveline that virtually or mathematically connects the drive shafts for each of the tires 102A-D. In certain embodiments, the virtual driveline may control or manage the driving power among the tires 102A-D. In certain embodiments, the control system 204 may control the drive system 208 to individually control each of the tires 102A-D to control vehicle mobility performance.

Figure 3:
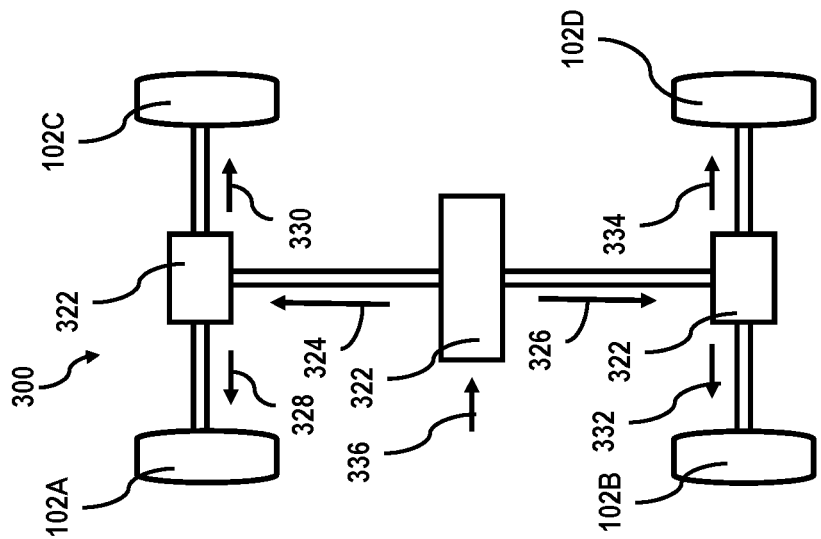
FIG. 3 illustrates a driving system for a vehicle system according to embodiments.

FIG. 3 illustrates a portion of another vehicle system 300 according to embodiments. Compared to the vehicle system 200, the vehicle system 300 includes a drive system 308 that is a mechanical driveline for driving the plurality of tires 102A-D. In this example, the drive system 308 receives a driving power (represented by arrow 336) and includes a plurality of power dividing units 322 that ultimately supply a driving power to each of the tires 102A-D. In some embodiments, a controller of a control system may control the power (represented by arrows 324 and 326) provided to each pair of tires and/or control the power (represented by arrows 328, 330, 332, 334) provided to each tire for controlling mobility performance of the vehicle system 300.

The vehicle systems 100, 200, 300 are provided for illustrative purposes only, and in other embodiments, the systems and methods described herein may be implemented in other types of vehicle systems with fewer, alternative, and/or additional components or features as desired.

Figure 4:
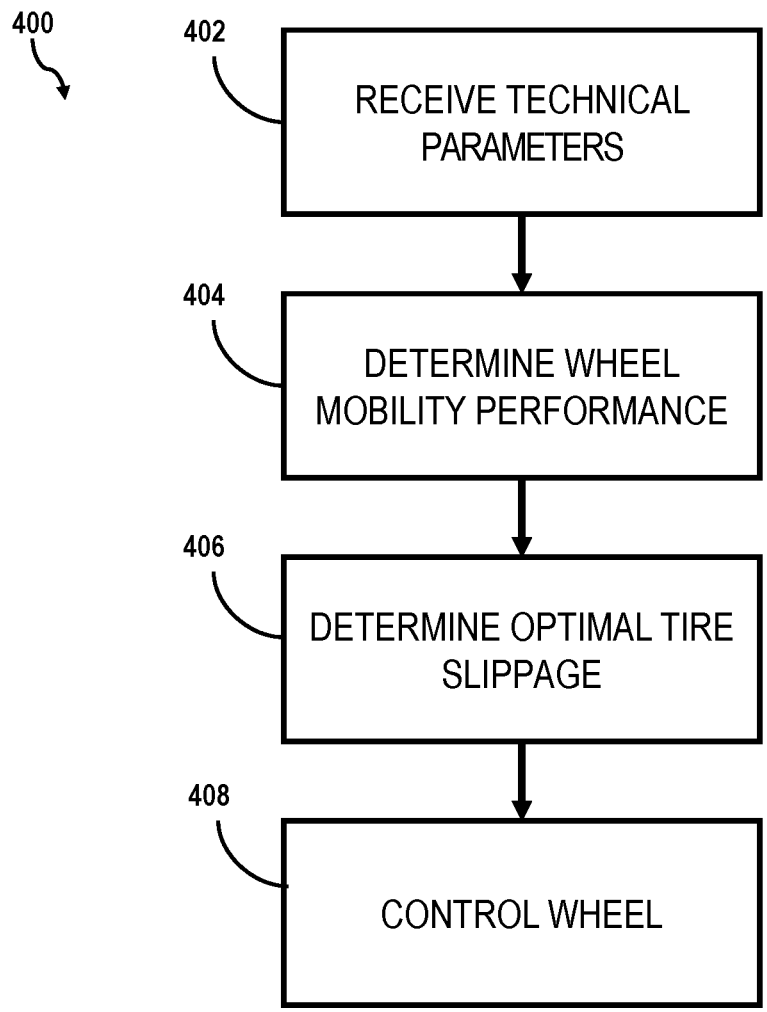
FIG. 4 illustrates a method for optimizing wheel mobility performance according to embodiments.

FIG. 4 shows a flowchart of a process 400 for determining a wheel mobility performance for a particular wheel or tire of a vehicle and optionally controlling the wheel or tire based on the wheel mobility performance according to various embodiments. The process 400 may be implemented in software executed by one or more processing units. The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment illustrated in FIG. 1, the process 400 may be performed by the control system 104.

In a block 402, the process 400 includes receiving a set of technical parameters of the wheel or tire that characterize the technical productivity and/or efficiency of the wheel operating on a given terrain. In certain embodiments, the set of technical parameters includes a wheel circumferential force as a first technical parameter and a velocity as a second technical parameter. In some embodiments, block 402 optionally includes receiving data from the one or more sensors 110 that measure such technical parameters in real-time during operation of the vehicle. However, in other embodiments, the technical parameters may be provided as otherwise desired, and block 402 need not be performed during operation of the vehicle. The wheel circumferential force as the first technical parameter is resulted from the wheel torque, which is a function of tire slippage, and the velocity as the second technical parameter is the actual velocity of the wheel determined in the presence of tire slippage. As such, both the wheel circumferential force and the velocity functionally depend on tire slippage.

In a block 404, the process 400 includes determining a wheel mobility performance of the wheel based on the set of technical parameters received in block 402. In certain embodiments, the wheel mobility performance (WMP) may be defined as $$WMP = \frac{F_x V_x}{R_z V_t} = \frac{F_x(1 - s_\delta)}{R_z}$$

where $F_x$ is the actual wheel circumferential force, $V_x$ is the actual velocity of the wheel within the plane of the wheel, $R_z$ is the wheel normal reaction, $V_t$ is a theoretical velocity at zero tire slippage, and $s_\delta$ is the tire slippage. In this definition, the product of $F_x V_x$ characterizes the actual mobility performance with regards to the potential, but never achievable product of $R_z V_t$. As such, in block 404, the actual mobility performance of the wheel can be assessed and determined because the closer $F_x V_x$ to $R_z V_t$, the better the mobility performance of the wheel. In certain embodiments, block 404 may be performed during real-time operation of the vehicle (e.g., real-time modeling and/or estimation of the wheel mobility performance), although it need not be in other embodiments.

In a block 406, the process 400 optionally includes determining an optimal tire slippage for the wheel on the terrain. In some embodiments, block 406 optionally includes generating a database or index of a plurality of combinations of wheel circumferential forces and velocities of the wheel on the terrain. In certain embodiments, block 406 may be defined as $$\frac{F_x(1-s_\delta)}{R_z} \to \max$$

where the optimal tire slippage, $s_{\delta*}$, is constrained to $$0 < s_{\delta*} < s_{\delta c} + \Delta$$

where $\Delta$ is a positive constant and $s_{\delta c}$ is the characteristic slippage for a tire on a given terrain. In various embodiments, when the tire slippage exceeds the characteristic slippage value, the nonlinearity of the traction characteristic drastically increases and any small increases in force results in an intensive tire slippage growth, which can quickly bring the wheel to complete immobilization. In block 406, the value of A depends on how far the optimal tire slippage is allowed to exceed the characteristic slippage and thus, to enter into the extremely nonlinear zone of the traction characteristic. For different terrains, magnitudes of $\Delta$ may be different and/or otherwise controlled as desired. Such lower bound constraints and upper bound constraints on the optimal tire slippage may ensure positive traction of the wheels while minimizing potential immobilization of the wheel. In order to extend the wheel mobility performance to deceleration or braking operations when tire slippage is negative (skidding), the relation between the wheel mobility performance and the braking performance is considered. First, one may define the wheel braking performance as $$WBP = \frac{F_x(V_t - V_x)}{R_z V_x} = \frac{F_x}{R_z} s_\delta = \frac{|F_x|}{R_z}|s_\delta|$$

where $F_x(V_t-V_x)>0$ is the actual slip power dissipated through the tire-terrain interaction, and $R_z V_x > 0$ is the maximum potential slip power. Note that both $F_x$ and $s_\delta$ are negative variables, however, their product is always positive. Next, the wheel mobility performance is defined as a complement of the wheel braking performance that is $$WMP = \frac{|F_x|}{R_z} - WBP = -\frac{F_x V_t}{R_z V_x} = -\frac{F_x(1+s_\delta)}{R_z}$$

where $-F_x V_t > 0$ is the actual braking power supporting the motion of the wheel. To unify the definition of the WMP for both positive and negative tire slippages, it can be rewritten as $$WMP = \frac{|F_x|(1-|s_\delta|)}{R_z}$$

The optimal WMP yields optimal tire slippage when $$\frac{|F_x|(1-|s_\delta|)}{R_z} \to \max$$

The optimal tire slippage, $s_{\delta*}$, is constrained to $$0 < |s_{\delta*}| < s_{\delta c} + \Delta$$

where $\Delta$ is a positive constant, and $s_{\delta c} > 0$ is the characteristic slippage for a tire on a given terrain. In this case, the optimization gives a solution for $|s_{\delta*}|$, which is equivalent to two solutions for $s_{\delta*}$ with different signs.

Optionally, block 406 may include determining the optimal tire slippage based on one or more operation parameters, which may be predetermined and/or otherwise determined or provided to the control system as desired. As some non-limiting examples, certain applications or operational modes of a vehicle may include constraints on velocity, and the velocity must be low and/or should not exceed a certain value within the plane of the wheel. Non-limiting examples include mine detection vehicles, pipe layer vehicles, self-recovering of vehicles with winch, egress of amphibious vehicles onto shore, farm tractors working on field preparation for planting, planting, and harvesting, etc. In such embodiments where the operation of the vehicle includes such additional operation parameters, block 406 may include determining the optimal tire slippage while meeting such operation parameters.

Optionally, a block 408 includes controlling the wheel of the vehicle based on the optimal tire slippage determined in block 406, based on other differences between the actual mobility performance and maximum mobility performance, and/or as otherwise desired. In some embodiments, block 408 includes determining the wheel circumferential force and velocity of at the optimal tire slippage, and controlling the wheel to have the wheel circumferential force and velocity corresponding to the optimal tire slippage. Block 408 may be implemented in various manners as desired. As a non-limiting example, block 408 may include the controller 106 generating a control signal to the driveline system 108 to control the driving power supplied to the particular wheel and thereby the wheel circumferential force and velocity. As another non-limiting example, block 408 may include the controller 106 generating a control signal to control a characteristic of the tire (e.g., an inflation pressure, shape of the tire, etc.) such that the tire operates and the wheel circumferential force and velocity corresponding with the optimal tire slippage. Various other types of control may be utilized as desired.

Figure 5:
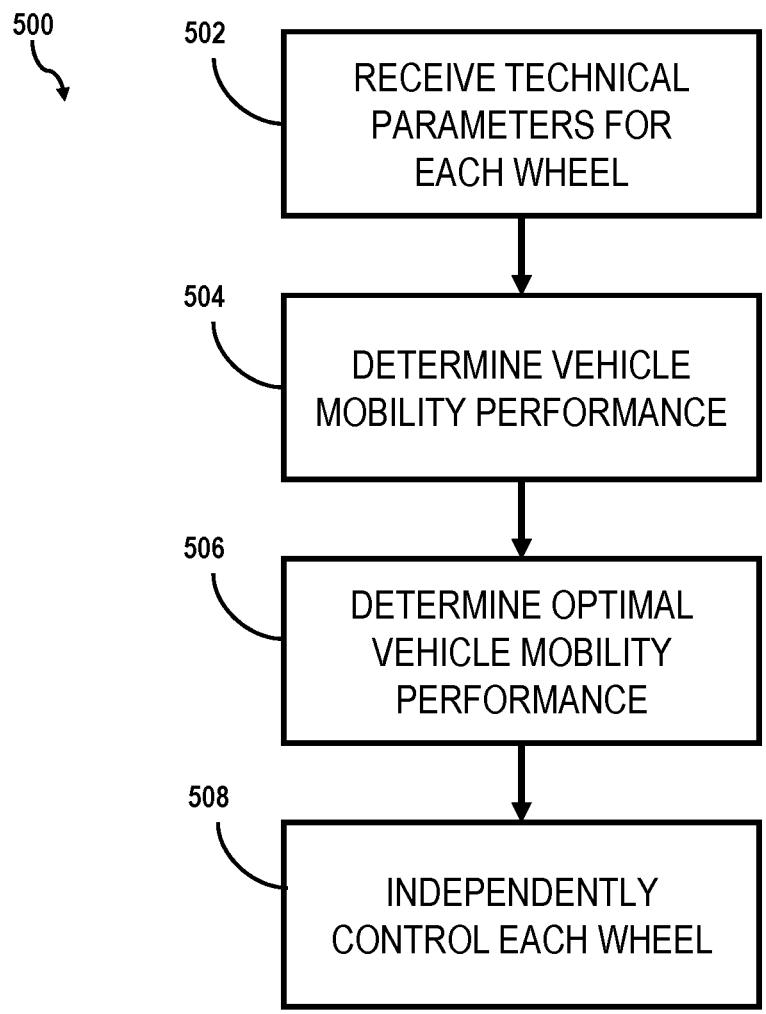
FIG. 5 illustrates a method for optimizing vehicle mobility performance according to embodiments.

FIG. 5 shows a flowchart of a process 500 for determining a vehicle mobility performance for a vehicle and optionally controlling the vehicle based on the vehicle mobility performance according to various embodiments. Similar to the process 400, the process 500 may be implemented in software executed by one or more processing units. The process 500 presented in FIG. 5 and described below is intended to be illustrative and non-limiting, and the sequence or order of steps should not be considered limiting. In certain embodiments, such as in the embodiment illustrated in FIG. 1, the process 500 may be performed by the control system 104. In certain embodiments, the process 500 may be based on the wheel mobility performance discussed previously, and the process may be utilized for a vehicle with a given number of drive wheels.

In a block 502, the process 500 includes receiving technical parameters for each wheel of the vehicle. In various embodiments, block 502 may be substantially similar to block 402 of the process 400 except that block 502 is performed for a plurality of wheels. In various embodiments, block 502 is performed individually for each wheel of the vehicle.

In a block 504, the process 500 includes determining a vehicle mobility performance of the vehicle based on the set of technical parameters received in block 502 for each wheel. In certain embodiments, the vehicle mobility performance (VMP) may be defined for a vehicle in turn as $$VMP = \frac{\sum_{i=1}^{n} F'_{xi}V'_{xi} + F''_{xi}V''_{xi}}{\sum_{i=1}^{n} R'_{zi}V'_{ti} + R''_{zi}V''_{ti}} = \frac{\sum_{i=1}^{n} F'_{xi}a'_{xi} + F''_{xi}a''_{xi}}{\sum_{i=1}^{n} R'_{zi}a'_{xi}/(1-s'_{\delta i}) + R''_{zi}a''_{xi}/(1-s''_{\delta i})}$$

where, $V_{xi}'$ and $V_{xi}''$ are actual velocities of the wheel within the plane of the wheels; $a_{xi}'$ and $a_{xi}''$ are the factors to reduce the actual velocities of the wheels within the plane of the wheels to the actual velocity of the vehicle along the longitudinal axis of the vehicle.

For a vehicle in a straight line motion, the vehicle mobility performance may be defined as $$VMP = \frac{\sum_{i=1}^{n} F'_{xi}V_x + F''_{xi}V_x}{\sum_{i=1}^{n} R'_{zi}V'_{ti} + R''_{zi}V''_{ti}} = \frac{\sum_{i=1}^{n} F'_{xi} + F''_{xi}}{\sum_{i=1}^{n} R'_{zi}/(1-s'_{\delta i}) + R''_{zi}/(1-s''_{\delta i})}$$

where ' and " denote the left and right wheels, n is the number of pairs of the left and right drive wheels (i.e., the number of the "drive axles") that follows the condition of n≤m, and m is the number of all the wheels of the vehicle, including the drive wheels and wheels that are not loaded with drive torques. In this definition, the combination of the actual mobility performance of each wheel of the vehicle is compared to the combined theoretical maximum performance of all the wheels to determine the vehicle mobility performance.

In a block 506, the process 500 optionally includes determining an optimal combination of tire slippages (e.g., the tire slippage for each wheel) to provide a maximum vehicle mobility performance. In some embodiments, block 506 optionally includes generating a database or index of a plurality of combinations of wheel circumferential forces and velocities for each wheel and a characterization of the combinations of tire slippages. It was surprisingly determined that for an optimal vehicle mobility performance, the optimal tire slippage may not necessarily be the same for all wheels. Block 506 may allow for the determination of the optimal combination of tire slippages because such a determination takes into account the particular characteristics or operating conditions of each particular wheel. As some non-limiting examples, different wheels may have different wheel rotational velocities, different traction characteristics, different sizes, operate on different terrains, develop different normal reactions due to weight distribution among the wheels, different suspension characteristics, and/or different terrain profiles under the wheels, among others. In certain embodiments, block 506 may be defined as
for a vehicle in turn $$\frac{\sum_{i=1}^{n} F'_{xi}a'_{xi} + F''_{xi}a''_{xi}}{\sum_{i=1}^{n} R'_{zi}a'_{xi}/(1-s'_{\delta i}) + R''_{zi}a''_{xi}/(1-s''_{\delta i})} \to \max$$

and, for a vehicle in straight line motion $$\frac{\sum_{i=1}^{n} F'_{xi} + F''_{xi}}{\sum_{i=1}^{n} R'_{zi}/(1-s'_{\delta i}) + R''_{zi}/(1-s''_{\delta i})} \to \max$$

The optimal tire slippages are constrained to $$0 < s_{\delta i^*}' < s_{\delta ci}' + \Delta_i'$$

$$0 < s_{\delta i^*}'' < s_{\delta ci}'' + \Delta_i''$$

Extending the vehicle mobility performance of a vehicle in turn using generalized WMP, one may write $$VMP = \frac{\sum_{i=1}^{n} |F'_{xi}|V'_{ti} + |F''_{xi}|V''_{ti}}{\sum_{i=1}^{n} R'_{zi}V'_{xi} + R''_{zi}V''_{xi}} = \frac{\sum_{i=1}^{n} |F'_{xi}|a'_{xi} + |F''_{xi}|a''_{xi}}{\sum_{i=1}^{n} R'_{zi}a'_{xi}/(1-|s'_{\delta i}|) + R''_{zi}a''_{xi}/(1-|s''_{\delta i}|)}$$

where, $V_{xi}'$ and $V_{xi}''$ are actual velocities of the wheel within the plane of the wheels; $a_{xi}'$ and $a_{xi}''$ are the factors to reduce the actual velocities of the wheels within the plane of the wheels to the actual velocity of the vehicle along the longitudinal axis of the vehicle.

For a vehicle in a straight line motion, the vehicle mobility performance may be defined as $$VMP = \frac{\sum_{i=1}^{n} |F'_{xi}|V'_{ti} + |F''_{xi}|V''_{ti}}{\sum_{i=1}^{n} R'_{zi}V'_{xi} + R''_{zi}V''_{xi}} = \frac{\sum_{i=1}^{n} |F'_{xi}| + |F''_{xi}|}{\sum_{i=1}^{n} R'_{zi}/(1-|s'_{\delta i}|) + R''_{zi}/(1-|s''_{\delta i}|)}$$

The optimization of the generalized VMP yields optimal combination of tires' slippages in any operating conditions of the wheels in case of either acceleration or deceleration. Specifically, for a vehicle in turn, the optimization yields $$\frac{\sum_{i=1}^{n} |F'_{xi}|a'_{xi} + |F''_{xi}|a''_{xi}}{\sum_{i=1}^{n} R'_{zi}a'_{xi}/(1-|s'_{\delta i}|) + R''_{zi}a''_{xi}/(1-|s''_{\delta i}|)} \to \max$$

and for a vehicle in straight line motion, the optimization yields $$\frac{\sum_{i=1}^{n} |F'_{xi}| + |F''_{xi}|}{\sum_{i=1}^{n} R'_{zi}/(1-|s'_{\delta i}|) + R''_{zi}/(1-|s''_{\delta i}|)} \to \max$$

The optimal tire slippages are constrained to $$0 < |s_{\delta i^*}'| < s_{\delta ci}' + \Delta_i'$$

$$0 < |s_{\delta i^*}''| < s_{\delta ci}'' + \Delta_i''$$

In other words, block 506 may include determining the combination of tire slippages on a given terrain for each wheel providing the maximum vehicle mobility performance. In certain embodiments, block 506 includes determining the optimal tire slippages for maximum vehicle mobility performance based on a slope of the terrain on which one of the wheels is operating, the type of terrain on which each wheel is operating, and/or based on drawbar pull on the vehicle. The term of drawbar pull covers the force to pull a trailer, inertia force during acceleration/deceleration, air resistance, etc. As some non-limiting examples, the value of the drawbar pull may affect the velocity of the vehicle and total resistance to motion, and a sloped terrain may similarly affect the velocity of the vehicle and total resistance to motion. Similar to block 405, block 506 may include determining the optimal combination of tire slippages for the wheels based on one or more operation parameters. As another non-limiting example, block 506 may include determining the combination of tire slippages while the vehicle is moving on split terrains (e.g., the front and rear wheels experience different terrains such as, but not limited to, a snowy dirt road, a meadow, or a soil field, among others).

Optionally, a block 508 includes individually controlling each wheel of the vehicle based on the optimal combination of tire slippages determined in block 506. In some embodiments, block 508 includes individually determining the wheel circumferential force and velocity for each wheel at the optimal vehicle mobility performance, and individual controlling the wheel to have the wheel circumferential force and velocity corresponding to the optimal tire slippage. In some embodiments, block 508 may include individually determining the wheel circumferential force and velocity for each wheel at the optimal vehicle mobility performance, and individual controlling the wheel to have the optimal tire slippage. Block 408 may be implemented in various manners as desired. As a non-limiting example, block 408 may include the controller 106 generating a control signal to the driveline system 108 to individually control the driving power supplied to the each of the wheels and thereby the wheel circumferential force and velocity for each wheel. In certain embodiments, based on the optimal tire slippages at the optimal vehicle mobility performance, block 508 optionally may include disengaging and/or otherwise not supply a driving power to one or more of the wheels. As a non-limiting example, block 506 may include a determination that a vehicle in a 4×2 mode (e.g., the rear wheels are driven while the front wheels are disengaged) has an improved mobility performance compared a vehicle in a 4×4 mode (e.g., all the wheels are driven by a driveline system), and block 508 may include sending a control signal or otherwise controlling the vehicle such that the vehicle is changed from a 4×4 mode to a 4×2 mode or otherwise controlled to disengaged the front wheels.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A method comprising: receiving a set of technical parameters associated with wheel power of at least one wheel of a vehicle on a terrain, the set of technical parameters comprising a first technical parameter and a second technical parameter, wherein the first technical parameter comprises a wheel circumferential force and the second technical parameter comprises a velocity; estimating an actual mobility performance based on the received set of technical parameters; determining a maximum mobility performance for the vehicle comprising the at least one wheel on the terrain; comparing the actual mobility performance to the maximum mobility performance; and controlling the vehicle based on a difference between the actual mobility performance and the maximum mobility performance.

Illustration 2. The method of any preceding or subsequent illustration or combination of illustrations, further comprising determining an optimal tire slippage for the at least one wheel on the terrain based on the mobility performance by determining the optimal tire slippage that is greater than 0 and less than a predetermined slippage of the at least one wheel.

Illustration 3. The method of any preceding or subsequent illustration or combination of illustrations, wherein the a predetermined slippage is greater than a characteristic slippage of the at least one wheel by a predetermined amount.

Illustration 4. The method of any preceding or subsequent illustration or combination of illustrations, wherein controlling the vehicle comprises controlling a driving power to the at least one wheel or controlling at least one characteristic of the wheel.

Illustration 5. A method comprising: receiving a plurality of sets of technical parameters associated with wheel power of at least one wheel for a vehicle on a terrain, each set of technical parameters comprising a first technical parameter and a second technical parameter, wherein the first technical parameter of each set comprises a wheel circumferential force and the second technical parameter of each set comprises a velocity; estimating an actual mobility performance for each set of technical parameters and based on the first technical parameter and the second technical parameter for each set of technical parameters; determining a maximum mobility performance for the vehicle comprising the at least one wheel on the terrain; generating a mobility performance index based on a comparison of the estimated actual mobility performances with the maximum mobility performance; determining an optimal tire slippage for the at least one wheel on the terrain based on the mobility performance index; and controlling the vehicle based on the optimal tire slippage.

Illustration 6. The method of any preceding or subsequent illustration or combination of illustrations, wherein determining the optimal tire slippage comprises determining the optimal tire slippage that is greater than 0 and less than a predetermined slippage of the at least one wheel.

Illustration 7. The method of any preceding or subsequent illustration or combination of illustrations, wherein the a predetermined slippage is greater than a characteristic slippage of the at least one wheel by a predetermined amount.

Illustration 8. The method of any preceding or subsequent illustration or combination of illustrations, further comprising determining the predetermined amount based an operational parameter of the vehicle.

Illustration 9. The method of any preceding or subsequent illustration or combination of illustrations, wherein controlling the vehicle comprises controlling a driving power to the at least one wheel or controlling at least one characteristic of the wheel.

Illustration 10. A vehicle system comprising: one or more data processors; and a non-transitory computer readable storage medium containing instructions which, when executed on the one or more data processors, cause the one or more data processors to perform actions including: receiving a plurality of sets of technical parameters associated with wheel power of at least one wheel of a vehicle on a terrain, each set of technical parameters comprising a first technical parameter and a second technical parameter, wherein the first technical parameter of each set comprises a wheel circumferential force and the second technical parameter of each set comprises a velocity; estimating an actual mobility performance for each set of technical parameters and based on the first technical parameter and the second technical parameter for each set of technical parameters; generating a mobility performance index based on a comparison of the estimated actual mobility performances with a maximum mobility performance for the vehicle on the terrain; determining an optimal tire slippage for the at least one wheel on the terrain based on the mobility performance index; and generating a control signal for controlling the vehicle based on the optimal tire slippage.

Illustration 11. The vehicle system of any preceding or subsequent illustration or combination of illustrations, further comprising at least one sensor configured to detect at least one of the set of technical parameters, wherein the at least one sensor is operably connected to the one or more data processors.

Illustration 12. The vehicle system of any preceding or subsequent illustration or combination of illustrations, further comprising a driving system configured to provide driving power to the at least one wheel for moving the vehicle system on the terrain, wherein the driving system is configured to control the driving power based on the control signal.

Illustration 13. The vehicle system of any preceding or subsequent illustration or combination of illustrations, wherein the driving system comprises a mechanical driveline or a virtual driveline.

Illustration 14. The vehicle system of any preceding or subsequent illustration or combination of illustrations, further comprising the at least one wheel.

Illustration 15. A method comprising: receiving a set of technical parameters associated with wheel power for each of a first wheel and a second wheel of a vehicle, the set of technical parameters comprising a first technical parameter and a second technical parameter, wherein the first technical parameter comprises a wheel circumferential force and the second technical parameter comprises a velocity; determining an optimal vehicle mobility performance by determining an optimal tire slippage for the first wheel based on the set of technical parameters for the first wheel and individually determining an optimal tire slippage for the second wheel based on the set of technical parameters for the second wheel; and individually controlling the first wheel and the second wheel such that the vehicle operates at the determined optimal vehicle mobility performance.

Illustration 16. The method of any preceding or subsequent illustration or combination of illustrations, wherein individually controlling the first wheel and the second wheel comprises controlling a driving system for controlling driving power provided to each of the first wheel and the second wheel.

Illustration 17. The method of any preceding or subsequent illustration or combination of illustrations, wherein determining the optimal tire slippages comprises determining the optimal tire slippage for the first wheel that is different from the optimal tire slippage for the second wheel based on the first wheel being on a first terrain and the second wheel being on a second terrain different from the first terrain.

Illustration 18. The method of any preceding or subsequent illustration or combination of illustrations, wherein determining the optimal tire slippages comprises immobilizing the first wheel or the second wheel based on the first wheel being on a first terrain and the second wheel being on a second terrain different from the first terrain.

Illustration 19. The method of any preceding or subsequent illustration or combination of illustrations, wherein determining the optimal tire slippages further comprises determining the optimal tire slippages based on a slope of a first terrain on which the first wheel is operating or based on a slope of a second terrain on which the second wheel is operating.

Illustration 20. The method of any preceding or subsequent illustration or combination of illustrations, wherein determining the optimal tire slippages further comprises determining the optimal tire slippages based on a drawbar pull loaded on the vehicle.

Illustration 21. The method of any preceding or subsequent illustration or combination of illustrations, wherein the first wheel is a front wheel and the second wheel is a rear wheel.

Illustration 22. A method comprising: receiving a plurality of sets of technical parameters associated with wheel power of each of a first wheel and a second wheel of a vehicle, each set of technical parameters comprising a first technical parameter and a second technical parameter, wherein the first technical parameter of each set comprises a wheel circumferential force and the second technical parameter of each set comprises a velocity; individually and for each of the first wheel and the second wheel: estimating an actual mobility performance for each set of technical parameters and based on the first technical parameter and the second technical parameter for each set of technical parameters; and generating a mobility performance index based on the estimated actual mobility performances; determining an optimal vehicle mobility performance by individually determining an optimal tire slippage for the first wheel based on the mobility performance index for the first wheel and individually determining an optimal tire slippage for the second wheel based on the mobility performance index for the second wheel; and individually controlling the first wheel and the second wheel such that the vehicle operates at the determined optimal vehicle mobility performance.

Illustration 23. The method of any preceding or subsequent illustration or combination of illustrations, wherein individually controlling the first wheel and the second wheel comprises controlling a driving system for controlling driving power provided to each of the first wheel and the second wheel.

Illustration 24. The method of any preceding or subsequent illustration or combination of illustrations, wherein determining the optimal tire slippages comprises determining the optimal tire slippage for the first wheel that is different from the optimal tire slippage for the second wheel based on the first wheel being on a first terrain and the second wheel being on a second terrain different from the first terrain.

Illustration 25. The method of any preceding or subsequent illustration or combination of illustrations, wherein individually controlling the first wheel and the second wheel comprises immobilizing the first wheel or the second wheel based on the first wheel being on a first terrain and the second wheel being on a second terrain different from the first terrain.

Illustration 26. The method of any preceding or subsequent illustration or combination of illustrations, wherein determining the optimal tire slippages further comprises determining the optimal tire slippages based on a slope of a first terrain on which the first wheel is operating or based on a slope of a second terrain on which the second wheel is operating.

Illustration 27. The method of any preceding or subsequent illustration or combination of illustrations, wherein determining the optimal tire slippages further comprises determining the optimal tire slippages based on a drawbar pull loaded on the vehicle.

Illustration 28. A vehicle system comprising: one or more data processors; and a non-transitory computer readable storage medium containing instructions which, when executed on the one or more data processors, cause the one or more data processors to perform actions including: receiving a plurality of sets of technical parameters associated with wheel power of each of a first wheel and a second wheel of a vehicle, each set of technical parameters comprising a first technical parameter and a second technical parameter, wherein the first technical parameter of each set comprises a wheel circumferential force and the second technical parameter of each set comprises a velocity; individually and for each of the first wheel and the second wheel: estimating an actual mobility performance for each set of technical parameters and based on the first technical parameter and the second technical parameter for each set of technical parameters; and generating a mobility performance index based on a comparison of the estimated actual mobility performances to a maximum mobility performance; determining an optimal vehicle mobility performance by individually determining an optimal tire slippage for the first wheel based on the mobility performance index for the first wheel and individually determining an optimal tire slippage for the second wheel based on the mobility performance index for the second wheel; and generating a control signal for individually controlling the first wheel and the second wheel such that the vehicle operates at the determined optimal vehicle mobility performance.

Illustration 29. The vehicle system of any preceding or subsequent illustration or combination of illustrations, further comprising at least one sensor configured to detect at least one of the set of technical parameters, wherein the at least one sensor is operably connected to the one or more data processors.

Illustration 30. The vehicle system of any preceding or subsequent illustration or combination of illustrations, further comprising a driving system configured to provide driving power to the first wheel and the second wheel for moving the vehicle system on the terrain, wherein the driving system is configured to control the driving power based on the control signal.

Illustration 31. The vehicle system of any preceding or subsequent illustration or combination of illustrations, wherein the driving system comprises a mechanical driveline or a virtual driveline.

Illustration 32. The vehicle system of any preceding or subsequent illustration or combination of illustrations, further comprising the first wheel and the second wheel.

Illustration 33. A method of controlling mobility performance of a wheel of a vehicle, the method comprising: receiving a plurality of circumferential forces for a wheel operating on a terrain and a plurality of velocities of the wheel operating on the terrain, wherein each circumferential force is paired with a corresponding velocity; determining an actual mobility performance for each paired circumferential force and velocity for the wheel operating on the terrain and generating a model of the actual mobility performance; determining an optimal slippage for the wheel operating on the terrain by comparing the each actual mobility performance to a maximum mobility performance for the wheel operating on the terrain and determining the optimal slippage from an actual mobility performance closest to the maximum mobility performance and with a slippage within a predetermined threshold of a characteristic slippage of the wheel on the terrain; and controlling the wheel to operate with the determined optimal slippage.

Illustration 34. The method of any preceding or subsequent illustration or combination of illustrations, wherein controlling the wheel comprises generating a control signal for controlling an actuation mechanism for the wheel or a characteristic of the wheel.

Illustration 35. The method of any preceding or subsequent illustration or combination of illustrations, wherein receiving the plurality of circumferential forces and the plurality of velocities comprises receiving the plurality of circumferential forces and the plurality of velocities from sensors associated with the vehicle.

Illustration 36. The method of any preceding or subsequent illustration or combination of illustrations, wherein controlling the wheel comprises controlling the wheel of an autonomous vehicle.

Illustration 37. The method of any preceding or subsequent illustration or combination of illustrations, wherein the terrain is a first type of terrain, and wherein the method comprises: receiving a second plurality of circumferential forces for the wheel operating on a second type of terrain different from the first type of terrain and a second plurality of velocities of the wheel operating on the second type of terrain, wherein each of the second circumferential forces is paired with a corresponding velocity of the second plurality of velocities; determining a second terrain actual mobility performance for each paired circumferential force and velocity for the wheel operating on the second terrain and generating a model of the second terrain actual mobility performance; determining a second optimal slippage for the wheel operating on the second terrain by comparing the each second terrain actual mobility performance to a maximum mobility performance for the wheel operating on the second terrain and determining the optimal slippage from a second terrain actual mobility performance closest to the maximum mobility performance and with a slippage within a predetermined threshold of a characteristic slippage of the wheel on the second terrain; and controlling the wheel to operate with the determined second optimal slippage on the second terrain.

Illustration 38. The method of any preceding or subsequent illustration or combination of illustrations, wherein determining the actual mobility performance for each paired circumferential force and velocity for the wheel operating on the terrain comprises determining the actual mobility performance based on a slope of the terrain.

Illustration 39. A method of controlling mobility performance of a vehicle comprising at least a first wheel and a second wheel, the method comprising: determining a first optimal tire slippage for the first wheel based on a circumferential force and a velocity of the first wheel operating on a first terrain; determining a second optimal tire slippage for the second wheel individual from the first wheel and based on a circumferential force and a velocity of the second wheel operating on a second terrain; and individually controlling the first wheel to operate at the first optimal tire slippage and the second wheel to operate at the second optimal tire slippage.

Illustration 40. The method of any preceding or subsequent illustration or combination of illustrations, wherein determining the first optimal tire slippage comprises: receiving a plurality of circumferential forces for the first wheel operating on the terrain and a plurality of velocities of the first wheel operating on the first terrain, wherein each circumferential force is paired with a corresponding velocity; determining an actual mobility performance for each paired circumferential force and velocity for the first wheel operating on the terrain and generating a model of the actual mobility performance; and determining the optimal slippage for the first wheel operating on the terrain by comparing the each actual mobility performance to a maximum mobility performance for the first wheel operating on the first terrain and determining the optimal slippage from an actual mobility performance closest to the maximum mobility performance and with a slippage within a predetermined threshold of a characteristic slippage of the first wheel on the first terrain.

Illustration 41. The method of any preceding or subsequent illustration or combination of illustrations, wherein determining the second optimal tire slippage comprises determining the second optimal tire slippage that is different form the first optimal tire slippage.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A method comprising:
   receiving a set of technical parameters associated with a wheel power of at least one wheel of a vehicle on a terrain, the set of technical parameters comprising a first technical parameter and a second technical parameter, wherein the first technical parameter comprises a wheel circumferential force and the second technical parameter comprises a velocity;
   estimating an actual mobility performance based on the received set of technical parameters;
   determining a maximum mobility performance for the vehicle comprising at least one wheel on the terrain;
   comparing the actual mobility performance to the maximum mobility performance; and
   controlling the vehicle based on a difference between the actual mobility performance and the maximum mobility performance.

2. The method of claim 1, further comprising determining an optimal tire slippage for at least one wheel on the terrain based on the actual mobility performance by determining the optimal tire slippage that is greater than 0 and less than a predetermined slippage of at least one wheel.

3. The method of claim 2, wherein the predetermined slippage is greater than a characteristic slippage of at least one wheel by a predetermined amount.

4. The method of claim 1, wherein controlling the vehicle comprises controlling a driving power to at least one wheel or controlling at least one characteristic of the wheel.

5. A method comprising:
   receiving a plurality of sets of technical parameters associated with a wheel power of at least one wheel for a vehicle on a terrain, each set of technical parameters comprising a first technical parameter and a second technical parameter, wherein the first technical parameter of each set comprises a wheel circumferential force and the second technical parameter of each set comprises a velocity;
   estimating an actual mobility performance for each set of technical parameters and based on the first technical parameter and the second technical parameter for each set of technical parameters, therefore generating estimated actual mobility performances;
   determining a maximum mobility performance for the vehicle comprising at least one wheel on the terrain;
   generating a mobility performance index based on a comparison of the estimated actual mobility performances with the maximum mobility performance;
   determining an optimal tire slippage for at least one wheel on the terrain based on the mobility performance index; and
   controlling the vehicle based on the optimal tire slippage.

6. The method of claim 5, wherein determining the optimal tire slippage comprises determining the optimal tire slippage that is greater than 0 and less than a predetermined slippage of at least one wheel.

7. The method of claim 6, wherein the predetermined slippage is greater than a characteristic slippage of at least one wheel by a predetermined amount.

8. The method of claim 7, further comprising determining the predetermined amount based on an operational parameter of the vehicle.

9. The method of claim 5, wherein controlling the vehicle comprises controlling a driving power to at least one wheel or controlling at least one characteristic of the at least one wheel.

10. A vehicle system comprising:
    one or more data processors; and
    a non-transitory computer readable storage medium containing instructions which, when executed on the one or more data processors, cause the one or more data processors to perform actions including:
      receiving a plurality of sets of technical parameters associated with a wheel power of at least one wheel of a vehicle on a terrain, each set of technical parameters comprising a first technical parameter and a second technical parameter, wherein the first technical parameter of each set comprises a wheel circumferential force and the second technical parameter of each set comprises a velocity;
      estimating an actual mobility performance for each set of technical parameters and based on the first technical parameter and the second technical parameter for each set of technical parameters, therefore generating estimated actual mobility performances;
      generating a mobility performance index based on a comparison of the estimated actual mobility performances with a maximum mobility performance for the vehicle on the terrain;
      determining an optimal tire slippage for at least one wheel on the terrain based on the mobility performance index;
      generating a control signal for controlling the vehicle based on the optimal tire slippage; and
      controlling the vehicle based on the control signal.

11. The vehicle system of claim 10, further comprising at least one sensor configured to detect at least one of the sets of technical parameters, wherein at least one sensor is operably connected to the one or more data processors.

12. The vehicle system of claim 10, further comprising a driving system configured to provide driving power to at least one wheel for moving the vehicle system on the terrain, wherein the driving system is configured to control the driving power based on the control signal.

13. The vehicle system of claim 12, wherein the driving system comprises a mechanical driveline or a virtual driveline.

14. The vehicle system of claim 10, further comprising at least one wheel of the vehicle on the terrain.

15. A method comprising:
    receiving a set of technical parameters associated with a wheel power for each of a first wheel and a second wheel of a vehicle, the set of technical parameters comprising a first technical parameter and a second technical parameter, wherein the first technical parameter comprises a wheel circumferential force and the second technical parameter comprises a velocity;

determining an optimal vehicle mobility performance by determining an optimal tire slippage for the first wheel based on the set of technical parameters and on a mobility performance index for the first wheel and individually determining an optimal tire slippage for the second wheel based on the set of technical parameters and on a mobility performance index for the second wheel; and individually controlling the first wheel and the second wheel such that the vehicle operates at the determined optimal vehicle mobility performance.

16. The method of claim 15, wherein individually controlling the first wheel and the second wheel comprises controlling a driving system for controlling driving power provided to each of the first wheel and the second wheel.

17. The method of claim 15, wherein determining the optimal tire slippages comprises determining the optimal tire slippage for the first wheel that is different from the optimal tire slippage for the second wheel based on the first wheel being on a first terrain and the second wheel being on a second terrain different from the first terrain.

18. The method of claim 15, wherein the first wheel is a front wheel and the second wheel is a rear wheel.

* * * * *